United States Patent
Wang et al.

(10) Patent No.: US 10,892,473 B2
(45) Date of Patent: Jan. 12, 2021

(54) POSITIVE ELECTRODE PLATE AND ELECTROCHEMICAL BATTERY

(71) Applicant: CONTEMPORARY AMPEREX TECHNOLOGY CO., LIMITED, Ningde (CN)

(72) Inventors: Ying Wang, Ningde (CN); Yongsheng Guo, Ningde (CN); Chengdu Liang, Ningde (CN); Xiqing Wang, Ningde (CN); Shuojian Su, Ningde (CN); Qian Liu, Ningde (CN)

(73) Assignee: CONTEMPORARY AMPEREX TECHNOLOGY CO., LIMITED, Nindge (CN)

( * ) Notice: Subject to any disclaimer, the term of this patent is extended or adjusted under 35 U.S.C. 154(b) by 222 days.

(21) Appl. No.: 16/152,199

(22) Filed: Oct. 4, 2018

(65) Prior Publication Data
US 2019/0190006 A1 Jun. 20, 2019

(30) Foreign Application Priority Data

Dec. 19, 2017 (CN) .......................... 2017 1 1374816

(51) Int. Cl.
| | |
|---|---|
| *H01M 4/00* | (2006.01) |
| *H01M 4/136* | (2010.01) |
| *H01M 4/58* | (2010.01) |
| *H01M 10/0525* | (2010.01) |
| *H01M 4/62* | (2006.01) |
| *H01M 4/02* | (2006.01) |
| *H01M 10/054* | (2010.01) |

(52) U.S. Cl.
CPC ......... *H01M 4/136* (2013.01); *H01M 4/5825* (2013.01); *H01M 4/622* (2013.01); *H01M 4/623* (2013.01); *H01M 10/0525* (2013.01); *H01M 4/625* (2013.01); *H01M 10/054* (2013.01); *H01M 2004/021* (2013.01); *H01M 2004/028* (2013.01)

(58) Field of Classification Search
CPC ............. H01M 4/136; H01M 4/625; H01M 2004/028; H01M 10/054; H01M 10/0525
See application file for complete search history.

(56) References Cited

U.S. PATENT DOCUMENTS

| | | |
|---|---|---|
| 2012/0328936 A1 | 12/2012 | Wessells et al. |
| 2013/0052538 A1 | 2/2013 | Pasta et al. |
| 2013/0257378 A1* | 10/2013 | Lu .......................... H01M 4/136 320/128 |
| 2014/0335409 A1 | 11/2014 | Wang et al. |
| 2015/0243987 A1 | 8/2015 | Lu et al. |
| 2015/0357630 A1 | 12/2015 | Lu et al. |
| 2017/0104204 A1* | 4/2017 | Zhamu ................ H01M 10/058 |

FOREIGN PATENT DOCUMENTS

CN         103620830 A        3/2014

OTHER PUBLICATIONS

Contemporary Amperex Technology Co., Limited, Chinese First Office Action, CN201711374816.0, dated Apr. 22, 2020, 6 pgs.
Contemporary Amperex Technology Co., Limited, Extended European Search Report, EP18203736.6, dated May 16, 2019, 7 pgs.

* cited by examiner

*Primary Examiner* — Cynthia H Kelly
*Assistant Examiner* — Monique M Wills
(74) *Attorney, Agent, or Firm* — Morgan, Lewis & Bockius LLP

(57) ABSTRACT

The present disclosure provides a positive electrode plate and an electrochemical battery. The positive electrode plate comprises a positive electrode current collector and a positive electrode film. The positive electrode film is provided on the positive electrode current collector and comprises a positive electrode active material and a binder. The positive electrode active material comprises a prussian blue analogue material, the binder is an oil-soluble binder, an area density of the positive electrode film is 5 mg/cm$^2$~30 mg/cm$^2$. In the positive electrode film of the present disclosure, the prussian blue analogue material is used together with the oil-soluble binder, and the area density of the positive electrode film is controlled within a certain range, so that introduction of the water molecule can be reduced during the preparation process and coating process of a positive electrode slurry, and cycle performance of the electrochemical battery can be improved.

18 Claims, No Drawings

POSITIVE ELECTRODE PLATE AND ELECTROCHEMICAL BATTERY

CROSS-REFERENCE TO RELATED APPLICATIONS

The present application claims priority to Chinese patent application No. CN201711374816.0, filed on Dec. 19, 2017, which is incorporated herein by reference in its entirety.

FIELD OF THE PRESENT DISCLOSURE

The present disclosure relates to the field of battery, and more specifically relates to a positive electrode plate and an electrochemical battery.

BACKGROUND OF THE PRESENT DISCLOSURE

Lithium-ion battery has become a primary choice of an energy storage device in for example computer, electrical tool, digital camera and the like, due to its high energy density, long cycle life, high safety performance and the like. In recent years, with the rapid development of the electric vehicle, the lithium-ion battery has been more widely used, but what comes with that is the shortage of lithium resources. Sodium-ion battery has aroused wide concern due to its rich raw material resources, safety performance, high energy density, low cost and environmental friendliness, but at present, the sodium-ion battery is still in the research and development stage, and the main problem is that the cycle performance is poor, and a positive electrode plate has an important influence on cycle performance of the sodium-ion battery.

In view of the above, the present disclosure is proposed.

SUMMARY OF THE PRESENT DISCLOSURE

In view of the problem existing in the background, an object of the present disclosure provides a positive electrode plate and an electrochemical battery, by selecting specific materials of a positive electrode film and controlling an area density of the positive electrode film to make the electrochemical battery have excellent cycle performance.

In order to achieve the above object, in a first aspect of the present disclosure, the present disclosure provides a positive electrode plate, which comprises a positive electrode current collector and a positive electrode film. The positive electrode film is provided on the positive electrode current collector and comprises a positive electrode active material and a binder. The positive electrode active material comprises a prussian blue analogue material, a molecular formula of the prussian blue analogue material is $A_xM_y[M'(CN)_6]_z \cdot nH_2O$, where, A is one or more selected from a group consisting of alkali metal cation, alkaline-earth metal cation, $Zn^{2+}$ and $Al^{3+}$, M is a transition metal, M' is a transition metal, $0<x\leq2$, $0<y\leq1$, $0<z\leq1$, $0<n\leq20$; the binder is an oil-soluble binder; an area density of the positive electrode film is 5 mg/cm$^2$~30 mg/cm$^2$.

In a second aspect of the present disclosure, the present disclosure provides an electrochemical battery, which comprises the positive electrode plate according to the first aspect of the present disclosure.

Compared to the technologies in the background, the present disclosure has the following beneficial effects: in the positive electrode film of the present disclosure, the prussian blue analogue material is used together with the oil-soluble binder, and the area density of the positive electrode film is controlled within a certain range, so that introduction of the water molecules can be reduced during the preparation process and coating process of a positive electrode slurry, which can avoid problem of high water content of the positive electrode active material and the positive electrode film when the water-soluble binder is used due to strong hygroscopicity of the prussian blue analogue material itself, thereby decreasing probability of side reactions between the water molecules and the electrolyte, and improving cycle performance of the electrochemical battery.

DETAILED DESCRIPTION

Hereinafter a positive electrode plate and an electrochemical battery according to the present disclosure are described in detail.

Firstly, a positive electrode plate according to a first aspect of the present disclosure is described.

The positive electrode plate according to the first aspect of the present disclosure comprises a positive electrode current collector and a positive electrode film, the positive electrode film is provided on the positive electrode current collector and comprises a positive electrode active material and a binder, the positive electrode active material comprises a prussian blue analogue material. A molecular formula of the prussian blue analogue material is $A_xM_y[M'(CN)_6]_z \cdot nH_2O$, where, A is one or more selected from a group consisting of alkali metal cation, alkaline-earth metal cation, $Zn^{2+}$ and $Al^{3+}$, M is a transition metal, M' is a transition metal, $0<x\leq2$, $0<y\leq1$, $0<z\leq1$, $0<n\leq20$. The binder is an oil-soluble binder. An area density of the positive electrode film is 5 mg/cm$^2$~30 mg/cm$^2$. Here "the area density of the positive electrode film" means an area density of the positive electrode film provided on one side of the positive electrode current collector.

In the positive electrode plate according to the first aspect of the present disclosure, the prussian blue analogue material is used together with the oil-soluble binder, and the area density of the positive electrode film is controlled within a certain range, so that introduction of the water molecules can be reduced during preparation process and coating process of a positive electrode slurry, which can avoid the problem of high water content of the positive electrode active material and the positive electrode film when the water-soluble binder is used due to strong hygroscopicity of the prussian blue analogue material itself, thereby decreasing probability of side reactions between the water molecules and the electrolyte, and improving cycle performance of the electrochemical battery.

In the positive electrode plate according to the first aspect of the present disclosure, preferably, A is one or more selected from a group consisting of Li$^+$, Na$^+$, K$^+$, Mg$^{2+}$, Ca$^{2+}$, Zn$^{2+}$ and Al$^{3+}$.

In the positive electrode plate according to the first aspect of the present disclosure, preferably, M is one selected from a group consisting of Mn, Fe, Co, Ni, Cu, Zn, V and Cr.

In the positive electrode plate according to the first aspect of the present disclosure, preferably, M' is one selected from a group consisting of Mn, Fe, Co, Ni, Cu, Zn, V and Cr.

In the positive electrode plate according to the first aspect of the present disclosure, the oil-soluble binder is one or more selected from a group consisting of polyvinylidene fluoride-type polymer, polybutadiene diacrylate, acrylonitrile-butadiene rubber, polyvinylpyrrolidone, styrenic block copolymer, hydrogenated styrene-butadiene block copolymer and polyacrylonitrile. Preferably, the oil-soluble binder is selected from polyvinylidene fluoride-type polymer. The polyvinylidene fluoride-type polymer is one or more selected from a group consisting of vinylidene fluoride monomer homopolymer, vinylidene fluoride monomer and fluorovinylidene monomer copolymer. A type of the vinylidene fluoride monomer and fluorovinylidene monomer copolymer is not particularly limited and may be selected according to actual demand. Specifically, the vinylidene fluoride monomer and fluorovinylidene monomer copolymer is one or more selected from a group consisting of vinylidene fluoride-hexafluoropropylene copolymer, vinylidene fluoride-trifluoroethylene copolymer, vinylidene fluoride-chlorotrifluoroethylene copolymer, vinylidene fluoride-tetrafluoro ethylene copolymer, vinylidene fluoride-trifluoroethylene-chlorofluoroethylene copolymer and tetrafluoro ethylene-hexafluoropropylene-vinylidene fluoride copolymer.

In the positive electrode plate according to the first aspect of the present disclosure, if the area density of the positive electrode film is too small, in view of total design of the electrochemical battery, a coating weight of a corresponding negative electrode plate also needs to be small, which will result in a low energy density of the electrochemical battery; in addition, too small area density is also substantially impossible to coat with a coating machine, thereby resulting in that the required capacity of the positive electrode plate and the negative electrode plate are difficult to accurately control and the fluctuation is too large, which is not beneficial to industrial production. If the area density of the positive electrode film is too large, under strict control of the production environment, a water carried by the prussian blue analogue material (comprises an adsorbed water, an intercrystalline water and a bound water) is still too high due to particularity of the prussian blue analogue material itself, as the increase of the area density, the content of the prussian blue analogue material in unit area will be increased and the water content of the positive electrode film will also increase. In the preparation process of the positive electrode plate, the adsorbed water of the prussian blue analogue material is easy to remove, but the intercrystalline water is difficult to remove during drying process, which will result in a high water content of the electrochemical battery. In addition, if the area density of the positive electrode film is too large, conduction of ions and electrons in the positive electrode film will also be influenced, these factors will influence cycle performance of the electrochemical battery finally. Therefore, preferably, the area density of the positive electrode film is 5 mg/cm$^2$~30 mg/cm$^2$. Further preferably, the area density of the positive electrode film is 8 mg/cm$^2$~16 mg/cm$^2$.

In the positive electrode plate according to the first aspect of the present disclosure, if a thickness of the positive electrode film is too small, a coating weight of the positive electrode slurry is also relatively small, the area density of the positive electrode film during coating process of the positive electrode slurry is difficult to accurately control, and it is not beneficial to product design and industrial production. If the thickness of the positive electrode film is too large, the water molecule is difficult to remove out from the surface of the positive electrode plate during drying process of the positive electrode plate, but the water molecule is easy to release from edges of the positive electrode plate, water molecule in the middle of the positive electrode plate will firstly diffuse to the edges of the positive electrode plate through capillary phenomenon and then released, so it is difficult to dry the positive electrode plate, at the same time there is a non-uniform drying phenomenon of the positive electrode plate (the water content at the edges is low, but the water content in the middle is high), so that the occurrence of the side reactions during charging-discharging process of the electrochemical battery is non-uniform and the performance of the electrochemical battery will be locally deteriorated. Meanwhile if the thickness of the positive electrode film is too large, the positive electrode film cannot be completely infiltrated by the electrolyte, a content of the positive electrode active material which can be used is decreased, thereby influencing performance of the electrochemical battery. Preferably, the thickness of is 30 µm~200 µm. Further preferably, the thickness of the positive electrode film is 50 µm~150 µm.

In the positive electrode plate according to the first aspect of the present disclosure, the water content of the positive electrode film is preferred controlled to 300 µg/g~3000 µg/g. If the water content is too low, the bound water in the prussian blue analogue material will be released and crystal structure of the prussian blue analogue material will collapse, if the water content is too high, probability of side reactions occurred between the water molecule and the electrolyte will increase, too high of the water content or too low of the water content will both influence cycle performance of the electrochemical battery. Preferably, the water content of the positive electrode film is 500 µg/g~2000 µg/g.

In the positive electrode plate according to the first aspect of the present disclosure, the positive electrode film further comprises a conductive agent. A type of the conductive agent is not particularly limited and may be selected according to actual demand. Specifically, the conductive agent is one or more selected from a group consisting of conductive carbon black, conductive graphite, carbon nanotube and carbon nanofiber. A content of the conductive agent of the positive electrode film is not particularly limited and may be selected according to actual demand, as long as the conductive effect can be achieved, and in view of improving energy density of the positive electrode plate, if the content of the conductive agent is too high, the content of the positive electrode active material will be relatively decreased, therefore the content of the conductive agent should not be too high. Preferably, a weight percentage of the conductive agent of the positive electrode film is 0.5%~30%, further preferably, the weight percentage of the conductive agent of the positive electrode film is 5%~20%.

In the positive electrode plate according to the first aspect of the present disclosure, if a ratio of the binder of the positive electrode film is too low, when the area density of the positive electrode film reaches a certain value, cohesiveness among particles of the positive electrode active material is poor, and there is a risk that the positive electrode film may be detached from the positive electrode current collector; however the binder may swell in the electrolyte, if a content of the binder is too high, the positive electrode film will swell to a large extent after the electrolyte was injected, thereby resulting in a poor contact among the particles of the positive electrode active material and influencing ions transport, and influencing cycle performance of the electrochemical battery. Preferably, a weight percentage of the binder of the positive electrode film is 1%~30%. Further preferably, the weight percentage of the binder of the positive electrode film is 5%~20%.

In the positive electrode plate according to the first aspect of the present disclosure, a type of the positive electrode current collector is not particularly limited and may be selected according to actual demand. Specifically, the positive electrode current collector is one selected from a group consisting of aluminum foil, porous aluminum foil, stainless steel foil and porous stainless steel foil.

In the positive electrode plate according to the first aspect of the present disclosure, preparation method of the positive electrode plate is not particularly limited and may be selected a conventional preparation method of the positive electrode plate. Specifically, the positive electrode active material, the conductive agent and the binder at a certain ratio can be mixed in an organic solvent to prepare a positive electrode slurry, then the positive electrode slurry at a certain area density is coated on the positive electrode current collector, finally, after drying, cold-pressing, the positive electrode plate is obtained.

Next, an electrochemical battery according to a second aspect of the present disclosure is described.

The electrochemical battery according to the second aspect of the present disclosure comprises the positive electrode plate according to the first aspect of the present disclosure.

In the electrochemical battery according to the second aspect of the present disclosure, the electrochemical battery may further comprise a negative electrode plate, an electrolyte and a separator.

In the electrochemical battery according to the second aspect of the present disclosure, the electrochemical battery is a lithium-ion battery, a sodium-ion battery, a potassium-ion battery, a zinc-ion battery or an aluminum-ion battery.

Hereinafter the present disclosure will be described in detail in combination with examples. It should be noted that, the examples described in the present disclosure are only used for explaining the present disclosure, and are not intended to limit the scope of the present disclosure.

Example 1

(1) Preparation of a positive electrode plate: $Na_2MnFe(CN)_6 \cdot 4H_2O$ (prussian blue analogue material, positive electrode active material), carbon black (conductive agent conductive) and vinylidene fluoride monomer homopolymer (binder) at a weight ratio of 80:10:10 were fully mixed, then N-methyl-2-pyrrolidone (NMP, organic solvent) was added, after 2 h stirring, a uniform positive electrode slurry was obtained. Where, vacuum was applied throughout the stirring process to reduce contact between the positive electrode slurry and water molecules in the air. Next the positive electrode slurry was coated on a surface of the aluminum foil (positive electrode current collector), drying was then performed for 24 h under 120° C., then after cold-pressing, slitting and welding an electrode tab, a positive electrode plate was obtained, where, an area density of the positive electrode film was 10 mg/cm², a water content of the positive electrode film measured was 1000 μg/g.

(2) Preparation of a negative electrode plate: negative electrode active material, binder and conductive agent at a weight ratio of 90:5:5 were uniformly mixed with a solvent to obtain a negative electrode slurry, where, the negative electrode active material was hard carbon, the binder was SBR, the conductive agent was conductive carbon black, the solvent was deionized water; then the negative electrode slurry was coated on an copper foil, after drying, cold-pressing and slitting, a negative electrode plate was obtained.

(3) Preparation of an electrolyte: ethylene carbonate (EC) and dimethyl carbonate (DMC) at a volume ratio of 1:1 were mixed to obtain a mixed organic solvent, then the fully dried $NaClO_4$ (sodium salt) was dissolved into the mixed organic solvent, the electrolyte was obtained, where, a concentration of the $NaClO_4$ was 1 mol/L.

(4) Preparation of a separator: conventional commercialized polypropylene (PP) film was selected as a separator.

(5) Preparation of a sodium-ion battery: the positive electrode plate, the negative electrode plate and the separator were wound to form an electrode assembly, then the electrode assembly was placed in a package case, next the electrolyte was injected, after forming, standing-by and the like, a sodium-ion battery was obtained.

Example 2

The preparation was the same as example 1, except that in the preparation of a positive electrode plate (step (1)), the area density of the positive electrode film was 5 mg/cm², the water content of the positive electrode film measured was 500 μg/g.

Example 3

The preparation was the same as example 1, except that in the preparation of a positive electrode plate (step (1)), the area density of the positive electrode film was 8 mg/cm², the water content of the positive electrode film measured was 800 μg/g.

Example 4

The preparation was the same as example 1, except that in the preparation of a positive electrode plate (step (1)), the area density of the positive electrode film was 16 mg/cm², the water content of the positive electrode film measured was 1500 μg/g.

Example 5

The preparation was the same as example 1, except that in the preparation of a positive electrode plate (step (1)), the area density of the positive electrode film was 18 mg/cm², the water content of the positive electrode film measured was 2000 μg/g.

Example 6

The preparation was the same as example 1, except that in the preparation of a positive electrode plate (step (1)), the area density of the positive electrode film was 30 mg/cm², the water content of the positive electrode film measured was 2800 μg/g.

Example 7

The preparation was the same as example 1, except that in the preparation of a positive electrode plate (step (1)), $Na_2MnFe(CN)_6 \cdot 4H_2O$ ((prussian blue analogue material, positive electrode active material)), carbon black (conductive agent conductive) and vinylidene fluoride monomer homopolymer (binder) at a weight ratio of 89:10:1 were fully mixed.

Example 8

The preparation was the same as example 1, except that in the preparation of a positive electrode plate (step (1)), $Na_2MnFe(CN)_6 \cdot 4H_2O$ ((prussian blue analogue material, positive electrode active material)), carbon black (conductive agent conductive) and vinylidene fluoride monomer homopolymer (binder) at a weight ratio of 85:10:5 were fully mixed.

Example 9

The preparation was the same as example 1, except that in the preparation of a positive electrode plate (step (1)), $Na_2MnFe(CN)_6 \cdot 4H_2O$ ((prussian blue analogue material, positive electrode active material)), carbon black (conductive agent conductive) and vinylidene fluoride monomer homopolymer (binder) at a weight ratio of 70:10:20 were fully mixed.

Example 10

The preparation was the same as example 1, except that in the preparation of a positive electrode plate (step (1)), $Na_2MnFe(CN)_6 \cdot 4H_2O$ ((prussian blue analogue material, positive electrode active material)), carbon black (conductive agent conductive) and vinylidene fluoride monomer homopolymer (binder) at a weight ratio of 60:10:30 were fully mixed.

Example 11

The preparation was the same as example 1, except that in the preparation of a positive electrode plate (step (1)), the binder was selected from vinylidene fluoride-tetrafluoro ethylene copolymer.

Example 12

The preparation was the same as example 1, except that in the preparation of a positive electrode plate (step (1)), the binder was selected from vinylidene fluoride-chlorotrifluoroethylene copolymer.

Example 13

The preparation was the same as example 1, except that in the preparation of a positive electrode plate (step (1)), the drying temperature was controlled to 140° C., the drying time was controlled to 48 h, the water content of the positive electrode film measured was 300 μg/g.

Example 14

The preparation was the same as example 1, except that in the preparation of a positive electrode plate (step (1)), the drying temperature was controlled to 120° C., the drying time was controlled to 16 h, the water content of the positive electrode film measured was 1500 μg/g.

Example 15

The preparation was the same as example 1, except that in the preparation of a positive electrode plate (step (1)), the drying temperature was controlled to 120° C., the drying time was controlled to 8 h, the water content of the positive electrode film measured was 3000 μg/g.

Example 16

The preparation was the same as example 1, except that in the preparation of a positive electrode plate (step (1)), the drying temperature was controlled to 140° C., the drying time was controlled to 72 h, the water content of the positive electrode film measured was 200 μg/g.

Example 17

The preparation was the same as example 1, except that in the preparation of a positive electrode plate (step (1)), the drying temperature was controlled to 120° C., the drying time was controlled to 6 h, the water content of the positive electrode film measured was 3200 μg/g.

Example 18

The preparation was the same as example 1, except that in the preparation of a positive electrode plate (step (1)), the binder was selected from nitrile rubber.

Comparative Example 1

The preparation was the same as example 1, except that in the preparation of a positive electrode plate (step (1)), $Na_2MnFe(CN)_6 \cdot 4H_2O$ (prussian blue analogue material, positive electrode active material), carbon black (conductive agent conductive), binder mixed of water-soluble binder butadiene styrene rubber (SBR) and carboxymethylcellulose sodium (CMC) (where, a weight ratio was SBR:CMC=8.5:1.5) at a weight ratio of 80:10:10 were fully mixed, then deionized water was added, after 2 h stirring, a uniform positive electrode slurry was obtained, next the positive electrode slurry was coated on a surface of an aluminum foil (positive electrode current collector) with a thickness of 16 m, drying was then performed for 24 h under 120° C., then after cold-pressing, slitting and welding an electrode tab, a positive electrode plate was obtained, where, an area density of the positive electrode film was 10 mg/cm², the water content of the positive electrode film measured was 3300 μg/g.

Comparative Example 2

The preparation was the same as example 1, except that in the preparation of a positive electrode plate (step (1)), $Na_2MnFe(CN)_6 \cdot 4H_2O$ (prussian blue analogue material, positive electrode active material), carbon black (conductive agent conductive) and polytetrafluoroethylene (PTFE, water-soluble binder) at a weight ratio of 80:10:10 were fully mixed, then deionized water was added, after 2 h stirring, a uniform positive electrode slurry was obtained, next the positive electrode slurry was coated on a surface of an aluminum foil (positive electrode current collector) with a thickness of 16 m, drying was then performed for 24 h under 120° C., then after cold-pressing, slitting, welding an electrode tab, a positive electrode plate was obtained, where, an area density of the positive electrode film was 10 mg/cm², a water content of the positive electrode film measured was 3500 g/g.

Comparative Example 3

The preparation was the same as example 1, except that in the preparation of a positive electrode plate (step (1)), the area density of the positive electrode film was 32 mg/cm², the water content of the positive electrode film measured was 3200 g/g.

Comparative Example 4

The preparation was the same as example 3, except that in the preparation of a positive electrode plate (step (1)), the drying time was adjusted to 30 h, the water content of the positive electrode film measured was 2800 g/g.

Finally, test processes and test results of the sodium-ion batteries were described, where, each group tested four times and took an average value.

(1) Test of the Area Density of the Positive Electrode Film:

A tablet punching machine with a diameter of 14 mm was used to punch the positive electrode plate into a small round with a diameter of 14 mm after cold-pressing, the mass of the positive electrode plate was weighted and marked as M1, then the same method was used to punch an aluminum foil (positive electrode current collector) with a diameter of 14 mm by the tablet punching machine, the mass of the aluminum foil was weighted and marked as M2.

Area density of the positive electrode film (mg/cm$^2$)= (Mass of the positive electrode plate $M1$−Mass of the aluminum foil (positive electrode current collector) $M2$))/Area of the positive electrode plate $S$.

(2) Test of Cycle Performance of the Sodium-Ion Battery:

At 25° C., the sodium-ion battery was charged to a voltage of 4.0V at a constant current of 1C, then the sodium-ion battery was charged to current of 0.2C at a constant voltage of 4.0V, next standing-by was performed for 5 min, then the sodium-ion was discharged to voltage of 1.9V at a constant current of 1C, standing-by was performed for 5 min again, this was a charging-discharging cycle process, the discharged capacity this time was marked as discharged capacity of the first cycle of the sodium-ion battery. Then the charge-discharge cycle of the sodium-ion battery was performed for 100 times, discharged capacity of 100$^{th}$ cycle of the sodium-ion battery was marked.

Capacity retention rate after 100$^{th}$ cycle of the sodium-ion battery (%)=(Discharged capacity of 100$^{th}$ cycle of the sodium-ion battery/Discharged capacity of first cycle of the sodium-ion battery)×100%.

(3) Test of Water Content of the Positive Electrode Film:

Karl Fischer Moisture Titrator was used to test water content of the positive electrode film, test process was as follow: a positive electrode plate with a certain mass which baked in a vacuum oven was taken out, for ease of testing, a tablet punching machine with a diameter of 14 mm was used to punch a small round sample with a diameter of 14 mm, the mass of the small round sample was marked as M1 (generally the mass of the sample was 0.2 g~1 g), then an aluminum foil (positive electrode current collector) with the same area was taken, the mass of the aluminum foil was marked as M2, the sampling process was usually performed in a drying room. The dried small round sample of the positive electrode plate was sealed in a penicillin bottle, and the water content of the corresponding positive electrode plate was tested by a Karl Fischer Moisture Titrator and marked as P1 (Karl Fischer Moisture Titrator increased temperature of instrument to 170° C.).

Water content $P$ of the positive electrode film (μg/g)= $P1/(M1−M2)$.

It should be noted that the water content measured was the total water content of the positive electrode film, which comprised the intercrystalline water and the bound water in the prussian blue analogue material crystal structure, the adsorbed water adsorbed on the surface of the prussian blue analogue material particle and located between the prussian blue analogue material particles.

TABLE 1

Parameters and test results of examples 1-18 and comparative examples 1-4

| | Binder | Positive electrode active material:conductive agent:binder | Area density of the positive electrode film (mg/cm$^2$) | Water content of the positive electrode film (μg/g) | Capacity retention rate after 100$^{th}$ cycle |
|---|---|---|---|---|---|
| Example 1 | Vinylidene fluoride monomer homopolymer | 80:10:10 | 10 | 1000 | 94.2% |
| Example 2 | Vinylidene fluoride monomer homopolymer | 80:10:10 | 5 | 500 | 95.8% |
| Example 3 | Vinylidene fluoride monomer homopolymer | 80:10:10 | 8 | 800 | 94.5% |
| Example 4 | Vinylidene fluoride monomer homopolymer | 80:10:10 | 16 | 1500 | 93.9% |
| Example 5 | Vinylidene fluoride monomer homopolymer | 80:10:10 | 18 | 2000 | 88.5% |
| Example 6 | Vinylidene fluoride monomer homopolymer | 80:10:10 | 30 | 2800 | 85.8% |
| Example 7 | Vinylidene fluoride monomer homopolymer | 89:10:1 | 10 | 1000 | 84.2% |
| Example 8 | Vinylidene fluoride monomer homopolymer | 85:10:5 | 10 | 1000 | 87.3% |
| Example 9 | Vinylidene fluoride monomer homopolymer | 70:10:20 | 10 | 1000 | 90.8% |
| Example 10 | Vinylidene fluoride monomer homopolymer | 60:10:30 | 10 | 1000 | 87.2% |

TABLE 1-continued

Parameters and test results of examples 1-18 and comparative examples 1-4

| | Binder | Positive electrode active material:conductive agent:binder | Area density of the positive electrode film (mg/cm$^2$) | Water content of the positive electrode film (μg/g) | Capacity retention rate after 100$^{th}$ cycle |
|---|---|---|---|---|---|
| Example 11 | Vinylidene fluoride-tetrafluoro ethylene copolymer | 80:10:10 | 10 | 1000 | 92.8% |
| Example 12 | Vinylidene fluoride-chlorotrifluoroethylene copolymer | 80:10:10 | 10 | 1000 | 92.5% |
| Example 13 | Vinylidene fluoride monomer homopolymer | 80:10:10 | 10 | 300 | 87.6% |
| Example 14 | Vinylidene fluoride monomer homopolymer | 80:10:10 | 10 | 1500 | 92.4% |
| Example 15 | Vinylidene fluoride monomer homopolymer | 80:10:10 | 10 | 3000 | 84.3% |
| Example 16 | Vinylidene fluoride monomer homopolymer | 80:10:10 | 10 | 200 | 83.1% |
| Example 17 | Vinylidene fluoride monomer homopolymer | 80:10:10 | 10 | 3200 | 83.3% |
| Example 18 | Acrylonitrile-butadiene rubber | 80:10:10 | 10 | 1000 | 85.4% |
| Comparative example 1 | SBR + CMC | 80:10:10 | 10 | 3300 | 75.5% |
| Comparative example 2 | PTFE | 80:10:10 | 10 | 3500 | 72.0% |
| Comparative example 3 | Vinylidene fluoride monomer homopolymer | 80:10:10 | 32 | 3200 | 70.2% |
| Comparative example 4 | Vinylidene fluoride monomer homopolymer | 80:10:10 | 32 | 2800 | 73.8% |

It could be known from example 1 and comparative examples 1-2, the cycle performance of the sodium-ion battery with the oil-soluble binder was superior to the cycle performance of the sodium-ion battery with the water-soluble binder. The reason was that, the prussian blue analogue material had strong hygroscopicity, when the binder was a water-soluble binder (the solvent was deionized water), the prussian blue analogue material was able to combine with more water molecules, however the introduction of the water molecule could be reduced by the oil-soluble binder during stirring process, so that the sodium-ion battery had excellent cycle performance. With the same preparation process, the same ratio and the same area density, the water content of the positive electrode film with the oil-soluble binder was obviously lower than the water content of the positive electrode film with the water-soluble binder.

It could be known from examples 1-6 and comparative examples 3-4, with the same preparation process, the greater the area density of the positive electrode film was, the higher the water content of the sodium-ion battery was, and the cycle performance of the sodium-ion battery would be increased with the increase of the area density, when the area density exceeded the given range (comparative examples 3-4), the cycle performance of the sodium-ion battery decreased obviously. It might be because that the greater the area density of the positive electrode film was, the more difficult to dry the positive electrode film was, the water content at the edges of the positive electrode plate might be lower than the water content in the middle of the positive electrode plate during drying process of the positive electrode plate, and the local deterioration of the performance of the sodium-ion battery was more serious during the charging-discharging process of the sodium-ion battery, the interface was destroyed and the performance of the sodium-ion battery was rapidly decreased. At the same time, if the area density of the positive electrode film was too large, conduction of ions and electrons in the positive electrode film would also be influenced, these factors would influence the cycle performance of the sodium-ion battery finally.

It could be shown from examples 13-17, if the water content of the positive electrode film was too low, it brought great difficulties to the preparation process, for example, a long time or a high temperature was needed for drying, and the increase of the drying temperature would influence performance of other components of the positive electrode film, the most critical thing was that the bound water of the prussian blue analogue material would be dried out and the crystal structure would be destroyed, crystal structure would be collapsed due to the deintercalation of sodium-ions during charging-discharging process; if the water content of the positive electrode film was too large, many side reactions would occur in the electrolyte during the charging-discharging process. Therefore, no matter too high of the water content of the positive electrode film or too low of the water content of the positive electrode film, cycle performance of the sodium-ion battery was reduced, so it was preferable to control the water content of the positive electrode film to be 300 μg/g~3000 μg/g, and it was more preferable to control the water content of the positive electrode film to be 500 μg/g~2000 μg/g.

It could be also known from examples 1-18, the oil-soluble binder could improve the cycle performance of the sodium-ion battery, and it shall be understood that the difference of the content and type of the oil-soluble binder was, the difference of the improvement of the sodium-ion battery was.

What is claimed is:

1. A positive electrode plate, comprising:
a positive electrode current collector; and
a positive electrode film, the positive electrode film being provided on the positive electrode current collector and comprising a positive electrode active material and a binder;
wherein,
the positive electrode active material comprises a prussian blue analogue material, a molecular formula of the prussian blue analogue material is $A_xM_y[M'(CN)_6]_z \cdot nH_2O$, where, A is one or more selected from a group consisting of alkali metal cation, alkaline-earth metal cation, $Zn^{2+}$ and $Al^{3+}$, M is a transition metal, M' is a transition metal, $0<x\leq2$, $0<y\leq1$, $0<z\leq1$, $0<n\leq20$;
the binder is an oil-soluble binder;
an area density of the positive electrode film is 5 $mg/cm^2$~30 $mg/cm^2$; and
a water content of the positive electrode film is 300 μg/g~3000 μg/g.

2. The positive electrode plate according to claim 1, wherein the oil-soluble binder is one or more selected from a group consisting of polyvinylidene fluoride-type polymer, polybutadiene diacrylate, acrylonitrile-butadiene rubber, polyvinylpyrrolidone, styrenic block copolymer, hydrogenated styrene-butadiene block copolymer and polyacrylonitrile.

3. The positive electrode plate according to claim 2, wherein the oil-soluble binder is selected from polyvinylidene fluoride-type polymer.

4. The positive electrode plate according to claim 2, wherein
the polyvinylidene fluoride-type polymer is one or more selected from a group consisting of vinylidene fluoride monomer homopolymer, vinylidene fluoride monomer and fluorovinylidene monomer copolymer;
the vinylidene fluoride monomer and fluorovinylidene monomer copolymer is one or more selected from a group consisting of vinylidene fluoride-hexafluoropropylene copolymer, vinylidene fluoride-trifluoroethylene copolymer, vinylidene fluoride-chlorotrifluoroethylene copolymer, vinylidene fluoride-tetrafluoro ethylene copolymer, vinylidene fluoride-trifluoroethylene-chlorofluoroethylene copolymer and tetrafluoro ethylene-hexafluoropropylene-vinylidene fluoride copolymer.

5. The positive electrode plate according to claim 1, wherein the area density of the positive electrode film is 8 $mg/cm^2$~16 $mg/cm^2$.

6. The positive electrode plate according to claim 1, wherein a thickness of the positive electrode film is 30 μm~200 μm.

7. The positive electrode plate according to claim 6, wherein the thickness of the positive electrode film is 50 μm~150 μm.

8. The positive electrode plate according to claim 1, wherein the water content of the positive electrode film is 500 μg/g~2000 μg/g.

9. The positive electrode plate according to claim 1, wherein a weight percentage of the binder of the positive electrode film is 1%~30%.

10. The positive electrode plate according to claim 9, wherein the weight percentage of the binder of the positive electrode film is 5%~20%.

11. The positive electrode plate according to claim 1, wherein the positive electrode film further comprises a conductive agent, the conductive agent is one or more selected from a group consisting of conductive carbon black, conductive graphite, carbon nanotube and carbon nanofiber.

12. The positive electrode plate according to claim 11, wherein a weight percentage of the conductive agent of the positive electrode film is 0.5%~30%.

13. The positive electrode plate according to claim 12, wherein the weight percentage of the conductive agent of the positive electrode film is 5%~20%.

14. An electrochemical battery, comprising a positive electrode plate, the positive electrode plate comprising a positive electrode current collector and a positive electrode film, the positive electrode film being provided on the positive electrode current collector and comprising a positive electrode active material and a binder;
wherein,
the positive electrode active material comprises a prussian blue analogue material, a molecular formula of the prussian blue analogue material is $A_xM_y[M'(CN)_6]_z \cdot nH_2O$, where, A is one or more selected from a group consisting of alkali metal cation, alkaline-earth metal cation, $Zn^{2+}$ and $Al^{3+}$, M is a transition metal, M' is a transition metal, $0<x\leq2$, $0<y\leq1$, $0<z\leq1$, $0<n\leq20$;
the binder is an oil-soluble binder;
an area density of the positive electrode film is 5 $mg/cm^2$~30 $mg/cm^2$; and
a water content of the positive electrode film is 300 μg/g~3000 μg/g.

15. The electrochemical battery according to claim 14, wherein the oil-soluble binder is one or more selected from a group consisting of polyvinylidene fluoride-type polymer, polybutadiene diacrylate, acrylonitrile-butadiene rubber, polyvinylpyrrolidone, styrenic block copolymer, hydrogenated styrene-butadiene block copolymer and polyacrylonitrile.

16. The electrochemical battery according to claim 14, wherein the area density of the positive electrode film is 8 $mg/cm^2$~16 $mg/cm^2$.

17. The electrochemical battery according to claim 14, wherein a thickness of the positive electrode film is 30 μm~200 μm.

18. The electrochemical battery according to claim 14, wherein a weight percentage of the binder of the positive electrode film is 1%~30%.

* * * * *